United States Patent
Raynal et al.

(10) Patent No.: US 12,132,838 B2
(45) Date of Patent: Oct. 29, 2024

(54) SECRET CODE VERIFICATION PROTOCOL

(71) Applicant: NAGRAVISION SARL, Cheseaux-sur-Lausanne (CH)

(72) Inventors: Mathilde Raynal, Lausanne (CH); Tommaso Gagliardoni, Zurich (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 281 days.

(21) Appl. No.: 17/873,897

(22) Filed: Jul. 26, 2022

(65) Prior Publication Data

US 2023/0027010 A1 Jan. 26, 2023

Related U.S. Application Data

(60) Provisional application No. 63/225,639, filed on Jul. 26, 2021.

(51) Int. Cl.
*H04L 9/32* (2006.01)
*H04L 9/00* (2022.01)
*H04L 9/08* (2006.01)

(52) U.S. Cl.
CPC ............ *H04L 9/3226* (2013.01); *H04L 9/008* (2013.01); *H04L 9/0825* (2013.01); *H04L 9/0869* (2013.01)

(58) Field of Classification Search
CPC ..... H04L 9/3226; H04L 9/008; H04L 9/0825; H04L 9/0869; H04L 2209/46; H04L 9/0863; H04L 9/32
See application file for complete search history.

(56) References Cited

U.S. PATENT DOCUMENTS 9,749,128 B2 * 8/2017 Calapodescu ............. H04L 9/30
11,201,725 B2 * 12/2021 Georgieva ............. H04L 9/008

* cited by examiner

*Primary Examiner* — Quazi Farooqui
(74) *Attorney, Agent, or Firm* — POLSINELLI LLP

(57) ABSTRACT

The present disclosure generally relates to code verification. For example, aspects of the present disclosure include systems and techniques for determining whether two codes are a match. One example method generally includes generating, at a first device, first encrypted data at least in part by encrypting verification data using a public key; generating, at the first device, second encrypted data at least in part by encrypting a random factor using the public key; generating, at the first device, a key for the verification data; generating, at the first device, third encrypted data at least in part by encrypting the key using the public key; computing, at the first device, fourth encrypted data at least in part by applying homomorphic encryption function to the first encrypted data, the second encrypted data, and the third encrypted data; and sending, to a second device, the fourth encrypted data.

12 Claims, 5 Drawing Sheets

300

Generate First Encrypted Data At Least In Part By Encrypting Verification Data Using A Public Key
302

Generate Second Encrypted Data At Least In Part By Encrypting A Random Factor Using The Public Key
304

Generate A Key For The Verification Data
306

Generate Third Encrypted Data At Least In Part By Encrypting The Key Using The Public Key
308

Compute Fourth Encrypted Data At Least In Part By Applying Homomorphic Encryption Function To The First Encrypted Data, The Second Encrypted Data, And The Third Encrypted Data
310

Send The Fourth Encrypted Data
312

```
┌─────────────────────────────────────────────────────┐
│ Receive, At A First Device, A First Encrypted Data  │
│ From A Second Device, The First Encrypted Data      │
│ Being Generated Based On First Verification Data    │
│ Associated With The Second Device                   │
│ 402                                                 │
└─────────────────────────────────────────────────────┘
                          │
                          ▼
┌─────────────────────────────────────────────────────┐
│ Decrypt, At The First Device, The First Encrypted   │
│ Data To Yield A Decryption Value                    │
│ 404                                                 │
└─────────────────────────────────────────────────────┘
                          │
                          ▼
┌─────────────────────────────────────────────────────┐
│ Generate, At The First Device, A Key For Second     │
│ Verification Data Associated With The First Device  │
│ 406                                                 │
└─────────────────────────────────────────────────────┘
                          │
                          ▼
┌─────────────────────────────────────────────────────┐
│ Compare, At The First Device, The Key And The       │
│ Decryption Value                                    │
│ 408                                                 │
└─────────────────────────────────────────────────────┘
                          │
                          ▼
┌─────────────────────────────────────────────────────┐
│ Determine, At The First Device, Whether The First   │
│ Verification Data And The Second Verification Data  │
│ Match Based On The Comparison                       │
│ 410                                                 │
└─────────────────────────────────────────────────────┘
```

FIG. 4

SECRET CODE VERIFICATION PROTOCOL

CROSS-REFERENCE TO RELATED APPLICATION

This application claims priority to provisional patent application U.S. Ser. No. 63/225,639 filed on Jul. 26, 2021, the content of which is incorporated by reference herein in its entirety.

FIELD

The present disclosure generally relates to code verification. For example, aspects of the present disclosure include systems and techniques for determining whether two codes are a match.

BACKGROUND

Data communicated on a wireless medium may be subject to security exploits. As a result, various techniques have been developed for the secure wireless exchange of data. Key exchange is a cryptography technique where keys are exchanged between two parties that allow for secure communication between the parties using a cryptographic algorithm. For example, public-key encryption may be used as a method of encrypting data using two keys. One of the keys may be referred to as the public key, which may be available to anyone. The other key is known as the private key (also referred to as a secret key) and is not made public. Data encrypted with the public key may be decrypted with the private key. Moreover, in cryptography, a ciphertext may be generated for wirelessly transmitting a message, the ciphertext referring to the result of encryption performed on plaintext using an algorithm called a cipher. Ciphertext contains a form of plaintext that is unreadable by a human or computer without the proper cipher to decrypt it.

SUMMARY

Certain aspects of the present disclosure provide a method for code verifiction. The method generally includes generating, at a first device, first encrypted data at least in part by encrypting verification data using a public key; generating, at the first device, second encrypted data at least in part by encrypting a random factor using the public key; generating, at the first device, a key for the verification data; generating, at the first device, third encrypted data at least in part by encrypting the key using the public key; computing, at the first device, fourth encrypted data at least in part by applying homomorphic encryption function to the first encrypted data, the second encrypted data, and the third encrypted data; and sending, to a second device, the fourth encrypted data.

Certain aspects of the present disclosure provide a method for code verification. The method generally includes receiving, at a first device, a first encrypted data from a second device, the first encrypted data being generated based on first verification data associated with the second device; decrypting, at the first device, the first encrypted data to yield a decryption value; generating, at the first device, a key for second verification data associated with the first device; comparing, at the first device, the key and the decryption value; and determining, at the first device, whether the first verification data and the second verification data match based on the comparison.

Certain aspects of the present disclosure provide an apparatus for code verification. The apparatus generally includes a memory and one or more processors coupled to the memory. The one or more processors may be configured to: generate first encrypted data at least in part by encrypting verification data using a public key; generate second encrypted data at least in part by encrypting a random factor using the public key; generate a key for the verification data; generate third encrypted data at least in part by encrypting the key using the public key; compute fourth encrypted data at least in part by applying homomorphic encryption function to the first encrypted data, the second encrypted data, and the third encrypted data; and send, to a second device, the fourth encrypted data.

Certain aspects of the present disclosure provide an apparatus for code verification. The apparatus generally includes a memory and one or more processors coupled to the memory. The one or more processors may be configured to: receive, at a first device, a first encrypted data from a second device, the first encrypted data being generated based on first verification data associated with the second device; decrypt, at the first device, the first encrypted data to yield a decryption value; generate, at the first device, a key for second verification data associated with the first device; compare, at the first device, the key and the decryption value; and determine, at the first device, whether the first verification data and the second verification data match based on the comparison This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 3 is a flow diagram illustrating example operations for code verification, in accordance with certain aspects of the present disclosure.

FIG. 4 is a flow diagram illustrating example operations for code verification, in accordance with certain aspects of the present disclosure.

DETAILED DESCRIPTION

Figure 1:
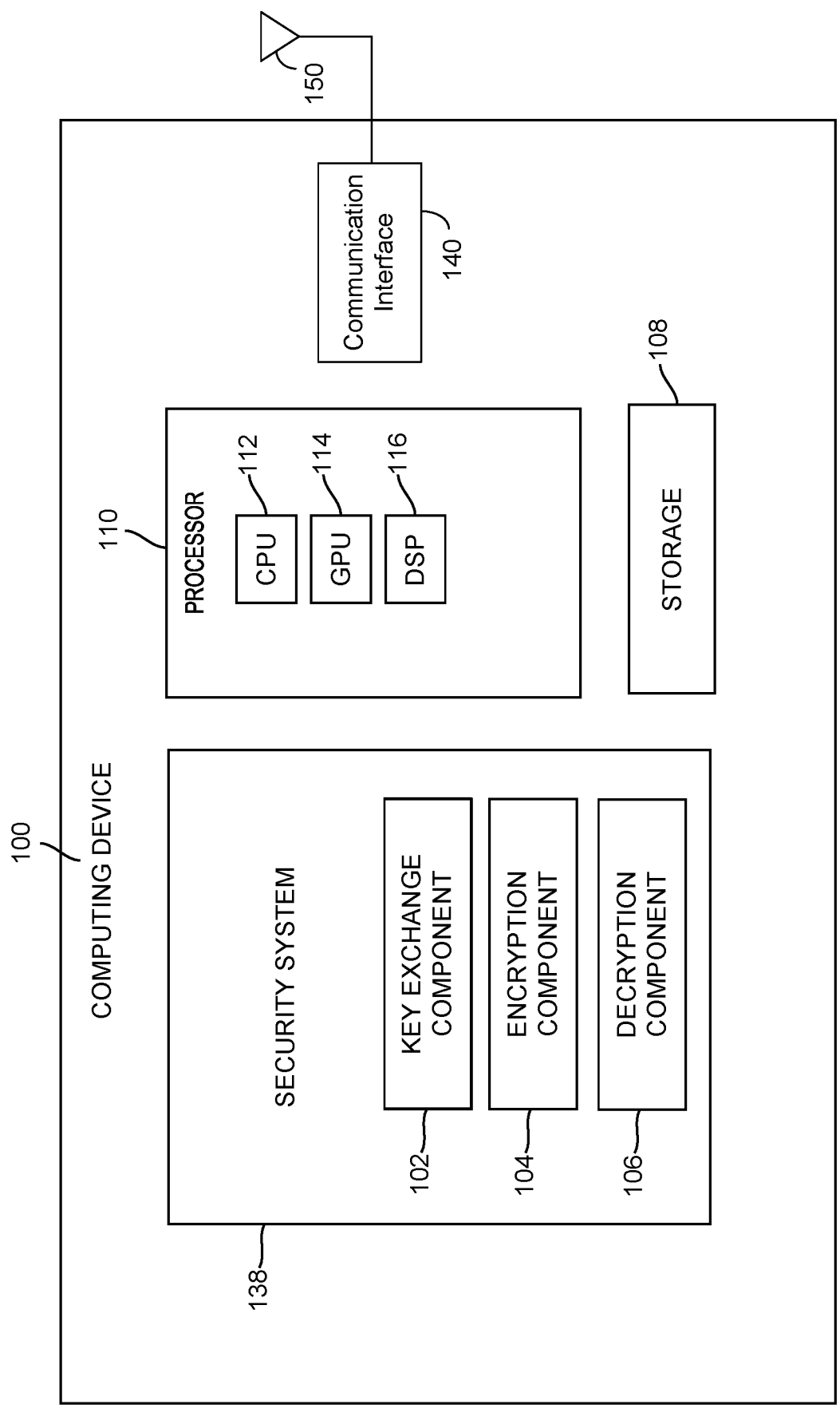
FIG. 1 is a diagram illustrating an example computing device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Systems, apparatuses, methods (or processes), and computer-readable media (collectively referred to herein as "systems and techniques") are provided herein for a zero-knowledge and quantum-resistant way to compare two small secrets respectively held by two users. For example, at the end of the protocol, the result of the comparison (match or no-match) is known by the participants without knowledge of both secrets being compared. The protocol is referred to herein as a secret code (e.g., personal identification number (PIN)) verification protocol or as "the protocol".

Private equality testing (PET) is a cryptographic primitive. A PET protocol allows two users to compare their respective inputs without revealing anything about their values to each other, unless there is a match. While there exist secure protocols in the classical and quantum adversarial settings, they are limited to comparing secrets with large entropy, making them unsuitable for many scenarios, such as when dealing with human-memorable secrets. The systems and techniques described herein include a quantum-resistant protocol that offers private equality testing of secrets with small entropy, such as 4-digits personal identification number (PIN) codes or other secret or private information. For instance, a zero-knowledge protocol is described herein that is secure, such as against offline dictionary attacks and/or other attacks.

One motivation behind extending PET to work with a low-entropy secret is illustrated by many real-life applications, such as active authentication, banking applications, and blockchain transaction confirmation. With respect to active authentication, in some situations, impersonation can be detected by comparing a pre-established secret (short enough to be easily remembered), or the answer to a personal question that only the expected correspondents should know ("what is your maiden name?"). With respect to banking applications, PIN code verification is a typical use case of PET as the bank wants to ensure that the card user typed the right code without revealing the expected code to potential thieves, whereas the cardholder wants to protect their credentials in case of fraudulent payment devices. The protocol described herein, by handling small and dynamic secrets, offers flexibility in password checking compared to existing approaches that use a pseudo-anonymized token stored in a database. With respect to blockchain transaction confirmation, PET can be used to compare sensitive values in a blockchain transaction such as the amount or the recipient's address. As these fields might be kept secret, a PET can be used to verify the integrity of requested transactions quickly.

In some examples, the protocol can combine Gentry's fully homomorphic encryption (FHE) scheme and password-based key derivation function (e.g., e.g., PBKDF2). With respect to Gentry's Homomorphic Encryption scheme, homomorphic encryption is a type of encryption that allows computations to be done on encrypted data directly. The secret key holder can decrypt the ciphertext and obtain the result of the computations as if they were applied on the plaintext. Gentry's scheme is a standardized fully homomorphic encryption (FHE) scheme. Its security relies on lattices problems, hence is believed to be quantum resistant. Gentry's scheme is composed of four functions: a key generation function, an encryption function, an evaluation function, and a decryption function. In theory, Gentry's scheme is supposed to be Turing complete, meaning that all operations, as costly as they are, can be computed on encrypted data. In practice, it is an open problem to compute arbitrary complex functions using Gentry's scheme efficiently. Computationally heavy operations induce some non-negligible noise that causes the decrypted value to be wrong. Computing those heavy operations involve collaboration between the participants.

PBKDF2 (e.g., a puzzle Function) will now be described. To date, the way to evaluate a hash function homomorphically on FHE ciphertexts is by using special hash functions explicitly designed to be low complexity and FHE-friendly. However, this is not the case for PBKDF2, a brute-force resistant and randomized hash function that is complex and FHE-unfriendly. As a result, homomorphically evaluating PBKDF2 on a ciphertext may require a bootstrapping procedure or denoising operations that cannot be performed without collaboration between the participants. The PBKDF2 key derivation function may have five input parameters, including a pseudorandom function of two parameters, a master password from which a derived key is generated, a sequence of bits, known as a cryptographic salt, the number of iterations desired, and the desired bit-length of the derived key.

The protocol described herein can be used for any secret or private information, such as a password, an address, a PIN, and/or other data or information. The protocol will be described with respect to PIN codes to facilitate understanding but may be applied to any data that may be used for verification.

FIG. 1 is a diagram illustrating an example computing device 100, in accordance with some examples. In the example shown, the computing device 100 may include storage 108, processor 110, and memory controller 112. Storage 108 can include any storage device(s) for storing data. The storage 108 can store data from any of the components of the computing device 100. In some implementations, the processor 110 can include a central processing unit (CPU) 112, a graphics processing unit (GPU) 114, and/or a digital signal processor (DSP) 116. In some aspects, the computing device 100 includes a security system 138. The security system may be any system, device, or one or more components of a system or device configured to provide cryptographic security. The security system 138 may be implemented as part of the processor 110, storage 108, and/or communication interface 140 in some aspects. The security system 138 may include a key exchange component 102, an encryption component 104, and a decryption component 106, which may be implemented in hardware, software, or a combination of hardware and software. In some aspects, the computing device 100 may include a communication interface 140 which may transmit or receive signals via at least one antenna 150. The key exchange component 102 may communication a key (e.g., public key) between devices, as described herein. The encryption component 104 may generate encrypt data to yield a ciphertext and the decryption component 106 may decrypt ciphertext, as described herein.

The secret code verification protocol will be described with respect to computing device A and computing device B, which hold the supposedly shared verification data which is in our example PIN codes $p_A$ and $p_B$ (e.g., $p_A$ stored in computing device A and $p_B$ stored in computing device B). It can be assumed without loss of generality that computing device A initiates the protocol. At the end of the protocol, computing device A determines a match if computing device B's PIN code matches computing device A's PIN code. This result can be used only by computing device A or shared with the computing device B by transmitting the result of the computing device b. In the case where both parties want to obtain the comparison result, an instance of the protocol initiated by computing device B can be intertwined with the one started by computing device A.

Computing device A (i.e. first device) may generate an FHE key pair (e.g., public and private keys). The public key of computing device A may be openly disclosed and transmitted and stored at computing device B. The private key associated with computing device A may be kept secret. Computing device A may use Gentry's encryption function to encrypt $p_A$, with the FHE public key and sends the resulting ciphertext $c_A$ to computing device B. Computing device B may then, using the public key associated with computing device A, encrypt $p_B$ to obtain $c_B$. Computing device B may sample (e.g., generate) a random factor r and encrypt r as to obtain $c_R$ with the FHE public key. Computing device B may compute a key derivation function (PBKDF2) of $p_B$ and encrypt PBKDF2($p_B$) using first device's public FHE key to obtain $c_H$. Using the FHE's evaluation function and computing device A's public key, computing device B combines $c_A$, $c_B$, $c_R$, and $c_H$ to obtain c representing a verification ciphertext:

$$c = c_R \times (c_B - c_A) + c_H$$

By Gentry FHE scheme's properties, note that this verification ciphertext is a FHE encryption of:

$$p = [r \times (p_B - p_A)] + \text{PBKDF2}(p_B)$$

Computing device B may then send c to computing device A. Using the FHE secret key associated with computing device A, computing device A decrypts c and obtains the verification plaintext p, which represents:

$$p = r \times (p_B - p_A) + \text{PBKDF2}(p_B)$$

Computing device A determines a match if this value is equal to PBKDF2($p_A$) (e.g., that computing device A may compute), and no match otherwise.

The match determination is facilitated from $r \times (p_B - p_A)$ being zero if the PIN codes match and a random number otherwise. Computing device A then receives either PBKDF2($p_B$) or a random number, allowing computing device A to determine whether there is a match. In some cases, computing device A may be a service provider device and computing device B may be a client device, as described in more detail with respect to FIG. 2. While some examples provided herein are described with respect to PBKDF2 to facilitate understanding, any key derivation function may be used.

Figure 2:
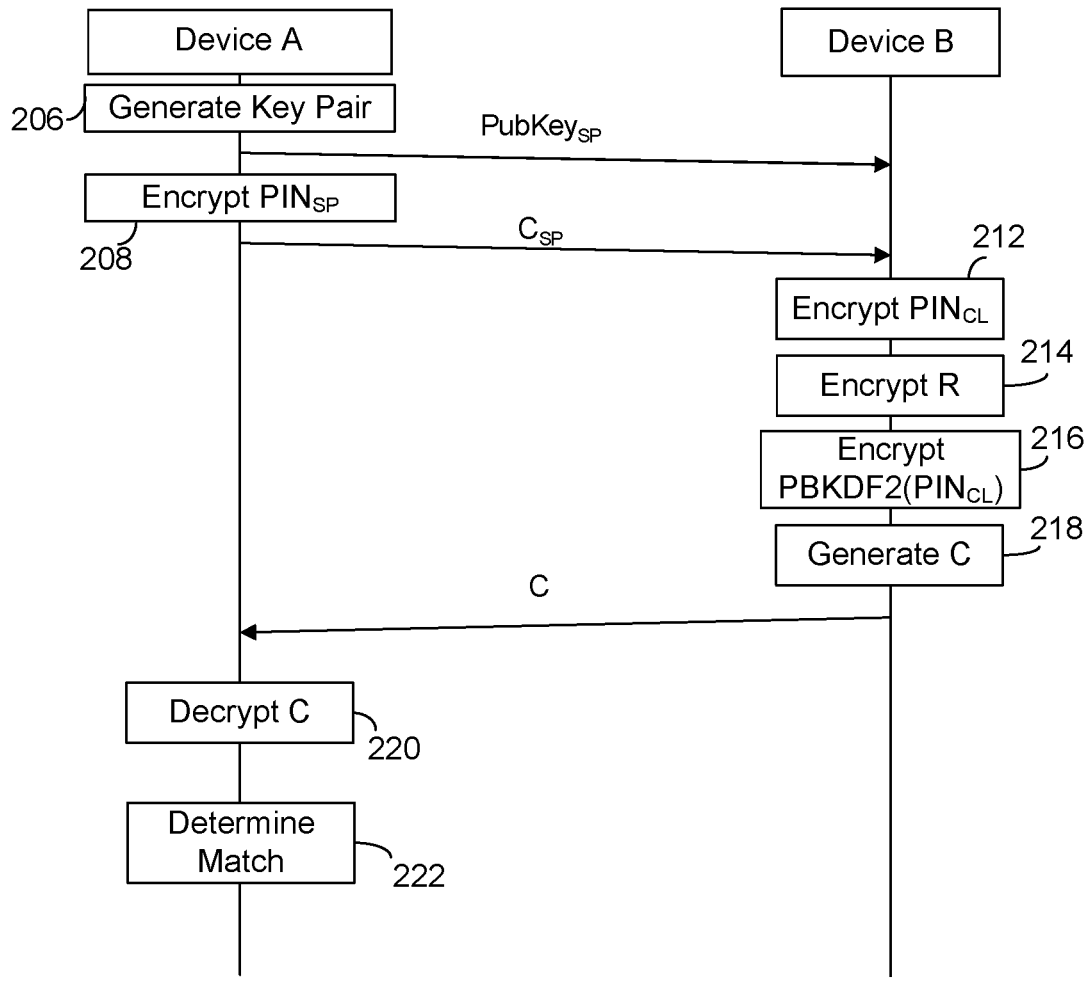
FIG. 2 is a diagram illustrating example operations for code verification, in accordance with certain aspects of the present disclosure.

FIG. 2 is a diagram illustrating example operations for code verification, in accordance with certain aspects of the present disclosure. As shown, computing device A (e.g., service provider (SP)) may, at block 206, generate a key pair including a public key (PubKey$_{SP}$) and private key (PrivKey$_{SP}$). The PubKey$_{SP}$ may be sent to computing device B (e.g., the client (CL)). At block 208, computing device A encrypts the PIN (PIN$_{SP}$) of computing device A using PrivKey$_{SP}$ to yield ciphertext $C_{SP}$, as follows:

$$C_{SP} = \text{ENC}_{PrivKeySP}(\text{PIN}_{SP})$$

$C_{SP}$ is then sent to computing device B. At block 212, computing device B encrypts the PIN of computing device B (PIN$_{CL}$) using PubKey$_{SP}$ to yield $C_{CL}$, as follows:

$$C_{CL} = \text{ENC}_{PubKeySP}(\text{PIN}_{CL})$$

As shown, computing device B generates a random factor (e.g., random value) and at block 214, encrypts the random value using PubKey$_{SP}$ to yield a ciphertext $C_R$, as follows:

$$C_R = \text{ENC}_{PubKeySP}(R)$$

Computing device B also performs a PBKDF2 function on the PIN of computing device B (PIN$_{CL}$) and at block 216, encrypts PBKDF2(PIN$_{CL}$) using PubKey$_{SP}$ to yield a ciphertext $C_H$, as follows:

$$C_H = \text{ENC}_{PubKeySP}(\text{PBKDF2}(\text{PIN}_{CL}))$$

Using an evaluation function (e.g., providing Gentry FHE functions such as add, substract, multiply), computing device B generates, at block 218, the ciphertext C per equation:

$$C = \text{EVAL}(C_R * (C_{CL} - C_{SP}) + C_H)$$

Ciphertext C may correspond to a value represented by the expression:

$$\text{ENC}_{PubKeySP}(R * (\text{PIN}_{CL} - \text{PIN}_{SP}) + \text{PBKDF2}(\text{PIN}_{CL})))$$

Computing device B then sends ciphertext C to computing device A, as shown.

At block 220, computing device A decrypts C using PrivKeySP to yield a value P as follows:

$$P = \text{DEC}_{PrivKeySP}(C)$$

The value P may be represented by the expression:

$$R \times (\text{PIN}_{CL} - \text{PIN}_{SP}) + \text{PBKDF2}(\text{PIN}_{CL})$$

Thus, if PIN$_{CL}$ is equal to PIN$_{SP}$, then P may be equal to PBKDF2(PIN$_{CL}$). Assume V is equal to PBKDF2(PIN$_{SP}$) which may be calculated by computing device A. Then if P is equal to V, it may be determined by computing device A at block 222 that the PIN of computing device A and the PIN of computing device B match.

The code verification protocol described herein provides security and privacy. For example, computing device B cannot maliciously cause a match without actually knowing the PIN code, and computing device A cannot infer computing device B's PIN code when participating in the protocol. The protocol described herein may be unforgeable. For example, computing device B cannot convince computing device A that computing device B knows $p_A$ if this is not the case. Computing device B would have to forge a ciphertext c that decrypts to PBKDF2($p_A$), using only the information publicly provided by computing device A (e.g., $c_A$ and the public key of computing device A. It is to be noted that according to one embodiment, the Computing device A may by the remote device and the Computing device B may by an electronic device willing to determine a match of the verification data supposedly stored on both side.

Other than attempting to coerce computing device A or guessing pA at random (e.g., with very low success probability), the hardness of homomorphically evaluating the PBKDF2 function makes it near impossible for an adversary to homomorphically evaluate PBKDF2 in $p_A$. For example, it may be impossible for an adversary to forge a ciphertext holding the encryption of PBKDF2($p_A$), given only the encryption of $p_A$.

The properties of Gentry's scheme ensure the privacy of both participants (e.g., since Gentry's FHE scheme is resistant to classical and quantum attacks). For any value $p_A$, computing device A inputs in the protocol, computing device A cannot extract computing device B's secret unless $p_A=p_B$. In fact, if this is not the case, computing device A receives a value indistinguishable from a random number (e.g., unless computing A can guess r and invert PBKDF2, which are both near impossible even for quantum adversaries).

FIG. 3 is a flow diagram illustrating example operations 300 for code verification, in accordance with certain aspects of the present disclosure. The operations 300 may be performed by a first computing device, such as computing device B described with respect to FIG. 2.

At block 302, the first computing device generates first encrypted data (e.g., ciphertext $C_{CL}$, described with respect to FIG. 2) at least in part by encrypting verification data (e.g., $PIN_{CL}$) using a public key (e.g., PubKeySP). The public key may be a public key of a second device (e.g., computing device A). The verification data includes one of a personal identification number (PIN), a password, a phrase (e.g., an answer to secret question), or an address.

At block 304, the first computing device may generate second encrypted data (e.g., ciphertext $C_R$) at least in part by encrypting a random factor (e.g., R) using the public key.

At block 306, the first computing device generates a key (e.g., PBKDF2($PIN_{CL}$)) for the data. The key for the verification data is generated using a password-based key derivation function.

At block 308, the first computing device generates third encrypted data (e.g., ciphertext $C_H$) at least in part by encrypting the key using the public key.

At block 310, the first computing device computes fourth encrypted data (e.g., ciphertext C) at least in part by applying homomorphic encryption function to the first encrypted data, the second encrypted data, and the third encrypted data; and At block 312, the first computing device sends the fourth encrypted data to a second device (e.g., computing device A). In some aspects, the first computing device receives a fifth encrypted data (e.g., $C_{SP}$), the fifth encrypted data being an encryption of a personal identification number (PIN) (e.g., or any second verification data) associated with the second device. The fourth encrypted data may be further generated based on the fifth encrypted data. The PIN may be encrypted using a private key associated with the second device.

In some cases, the fourth encrypted data may be generated based on a difference between the first encrypted data and the fifth encrypted data. The fourth encrypted data is generated based on a product of the second encrypted data and the difference between the first encrypted data and the fifth encrypted data.

FIG. 4 is a flow diagram illustrating example operations 400 for code verification, in accordance with certain aspects of the present disclosure. The operations 400 may be performed by a first computing device, such as computing device A described with respect to FIG. 2.

At block 402, the first computing device receives a first encrypted data from a second device, the first encrypted data being generated based on first verification data associated with the second device. The first encrypted data may be decrypted using a private key associated with the first device At block 404, the first computing device decrypts the first encrypted data to yield a decryption value At block 406, the first computing device generates a key for second verification data associated with the first device. The first verification data may include a first personal identification number (PIN), a first password, a first phrase, or a first address, and the second verification data may include a second PIN, a second password, a second phrase, or a second address. The key for the second verification data is generated using a password-based key derivation function At block 408, the first computing device compares the key and the decryption value. Comparing the key and the decryption value may include determining whether they key matches the decryption value.

At block 410, the first computing device determines whether the first verification data and the second verification data match based on the comparison. In some aspects, the decryption value may be a random number when the first verification data does not match the second verification data. In some aspects, the first computing device also generates second encrypted data (e.g., $C_{SP}$) at least in part by encrypting the second verification data, and sending the second encrypted data to the second device. The second verification data may be encrypted using a private key (e.g., PrivKeySP) associated with the first device.

In some cases, in accordance with aspects described herein, a process for determining a match between verification data (pA) of a first device and verification data (pB) of a second device is provided. In some cases, the verification data (pA) of the first device includes one of a personal identification number (PIN), a password, a phrase, or an address. The process may include generating, at the first device, a pair of keys including a public fully homomorphic encryption (FHE) key and a private FHE key. The process may include sending, by the first device, the public FHE key to the second device. The process may include generating, at the first device, first encrypted data (cA) at least in part by encrypting the verification data (pA) of the first device using the public FHE key of the first device. The process may include sending, by the first device, the first encrypted data to the second device.

In some cases, the process may further include generating, at the second device, second encrypted data (cB) at least in part by encrypting the verification data (pB) of the second device using the public FHE key of the first device. The process may include generating, at the second device, third encrypted data (cR) at least in part by encrypting a random factor (r) using the public FHE key of the first device. The process may include generating, at the second device, fourth encrypted data (cH) at least in part by encrypting a key derivation function of the verification data (pB) of the second device using the public FHE key of the first device. In some cases, the key derivation function includes a password-based key derivation function.

The process may include generating, at the second device, verification ciphertext (c) at least in part by encrypting a combination of the first, the second, the third, and the fourth encrypted data using the public FHE key of the first device.

The process may further include receiving, at the first device from the second device, the verification ciphertext and decrypting, at the first device, the verification ciphertext using the private FHE key of the first device to obtain a verification plaintext (p). The process may include verifying, at the first device, that the verification plaintext (p) matches the key derivation function of the verification data (pA) of the first device. In some cases, the process may include sending the result of the match to the second device. In some examples, the fourth encrypted data is generated based on a difference between the first encrypted data and the fifth encrypted data. In some aspects, the fourth encrypted data is generated based on a product of the second encrypted data and the difference between the first encrypted data and the fifth encrypted data.

In some cases, in accordance with aspects described herein, a process for determining a match between verification data (pB) of a first device and verification data (pA) of a second device is provided. The process may include receiving, at the first device, a public key from a pair of keys including a public fully homomorphic encryption (FHE) key and a private FHE key. The process may include receiving, at the first device, first encrypted data (cA) generated based on encryption of at least the verification data (pA) of the second device using the public FHE key. The process may further include generating, at the first device, second encrypted data (cB) at least in part by encrypting verification data (pB) of the first device using the public FHE key. In some examples, the verification data (pB) of the first device is encrypted using a private key associated with the second device. The process may include generating, at the first device, third encrypted data (cR) at least in part by encrypting a random factor (r) using the public FHE key. The process may further include generating, at the first device, fourth encrypted data (cH) at least in part by encrypting a key derivation function of the verification data (pA) of the second device using the public FHE key. In some examples, the fourth encrypted data is generated based on a difference between the first encrypted data and the fifth encrypted data. The process may include generating, at the first device, verification ciphertext (c) at least in part by encrypting a combination of the first, the second, the third, and the fourth encrypted data using the FHE public key. The process may further include receiving, at the first device, a match result from the second device if decryption of the verification ciphertext (c), using the FHE private key matches the key derivation function of the verification data (pA) of the second device.

In some examples, the processes described herein may be performed by a computing device or apparatus. The computing device can include any suitable device, such as a mobile device (e.g., a mobile phone), a desktop computing device, a tablet computing device, a wearable device (e.g., a virtual reality headset, an augmented reality headset, augmented reality glasses, a network-connected watch or smartwatch, or other wearable device), a server computer, an autonomous vehicle or computing device of an autonomous vehicle, a robotic device, a television, a set-top box, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

Figure 5:
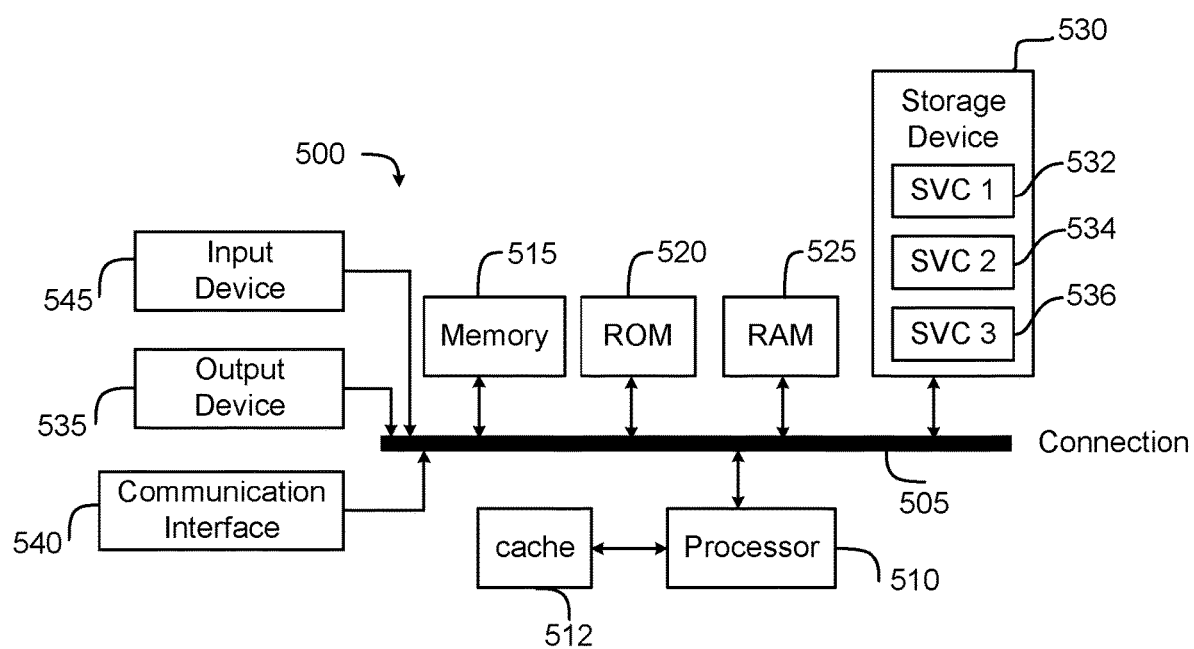
FIG. 5 illustrates an architecture of a computing system, in accordance with certain aspects of the present disclosure.

FIG. 5 illustrates an architecture of a computing system 500 wherein the components of the system 500 are in electrical communication with each other using a connection 505, such as a bus. Exemplary system 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable client interaction with the computing system 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a client to provide multiple types of input to communicate with the computing system 500. The communications interface 540 can generally govern and manage the client input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes may be described or illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the present disclosure include:

Aspect 1: A method comprising: encrypting, by a first device, data using a Fully Homomorphic Encryption (FHE) function and a PBKDF2 function; and sending, by the first device, the encrypted data to a second device.

Aspect 2: The method of aspect 1, wherein the data includes a personal identification number (PIN).

Aspect 3: The method of aspect 1, wherein the data includes one of a personal identification number (PIN), a password, or an address.

Aspect 4: An apparatus comprising a memory configured to store media data and a processor implemented in circuitry and configured to perform operations according to any of aspects 1 to 3.

Aspect 5: The apparatus of aspect 4, wherein the apparatus is a server computer.

Aspect 6: The apparatus of aspect 4, wherein the apparatus is a mobile device.

Aspect 7: The apparatus of aspect 4, wherein the apparatus is a set-top box.

Aspect 8: The apparatus of aspect 4, wherein the apparatus is a personal computer.

Aspect 9: A computer-readable storage medium storing instructions that when executed cause one or more processors of a device to perform the methods of any of aspects 1 to 3.

Aspect 10: An apparatus comprising one or more means for performing operations according to any of aspects 1 to 3.

Aspect 11: A method comprising: generating, at a first device, first encrypted data at least in part by encrypting data using a public key; generating, at the first device, second encrypted data at least in part by encrypting a random factor using the public key; generating, at the first device, a key for the data using a PBKDF2 function; generating, at the first device, third encrypted data at least in part by encrypting the key using the public key; and homomorphically computing, at the first device, fourth encrypted data at least in part by applying a Fully Homomorphic Encryption (FHE) function to the first encrypted data, the second encrypted data, and the third encrypted data.

Aspect 12: The method of aspect 11, further comprising: sending, by a first device, the fourth encrypted data to a second device.

Aspect 13: The method of any one of aspects 11 or 12, wherein the data includes a personal identification number (PIN).

Aspect 14: The method of any one of aspects 11 or 12, wherein the data includes one of a personal identification number (PIN), a password, or an address.

Aspect 15: An apparatus comprising a memory configured to store media data and a processor implemented in circuitry and configured to perform operations according to any of aspects 11 to 14.

Aspect 16: The apparatus of aspect 15, wherein the apparatus is a server computer.

Aspect 17: The apparatus of aspect 15, wherein the apparatus is a mobile device.

Aspect 18: The apparatus of aspect 15, wherein the apparatus is a set-top box.

Aspect 19: The apparatus of aspect 15, wherein the apparatus is a personal computer.

Aspect 20: A computer-readable storage medium storing instructions that when executed cause one or more processors of a device to perform the methods of any of aspects 1 to 19.

Aspect 21: An apparatus comprising one or more means for performing operations according to any of aspects 1 to 19.

Aspect 22: A method for determining a match between verification data (pA) of a first device and verification data (pB) of a second device, comprising: generating, at the first device, a pair of keys including a public fully homomorphic encryption (FHE) key and a private FHE key; sending, by the first device, the public FHE key to the second device; generating, at the first device, first encrypted data (cA) at least in part by encrypting the verification data (pA) of the first device using the public FHE key of the first device; sending, by the first device, the first encrypted data to the second device; generating, at the second device, second encrypted data (cB) at least in part by encrypting the verification data (pB) of the second device using the public FHE key of the first device; generating, at the second device, third encrypted data (cR) at least in part by encrypting a random factor (r) using the public FHE key of the first device; generating, at the second device, fourth encrypted data (cH) at least in part by encrypting a key derivation function of the verification data (pB) of the second device using the public FHE key of the first device; generating, at the second device, verification ciphertext (c) at least in part by encrypting a combination of the first, the second, the third, and the fourth encrypted data using the public FHE key of the first device; receiving, at the first device from the second device, the verification ciphertext; decrypting, at the first device, the verification ciphertext using the private FHE key of the first device to obtain a verification plaintext (p); and verifying, at the first device, that the verification plaintext (p) matches the key derivation function of the verification data (pA) of the first device.

Aspect 23: The method of claim 22, further comprising sending a result of the match to the second device.

Aspect 24: The method of Aspect 22, wherein the fourth encrypted data is generated based on a difference between the first encrypted data and fifth encrypted data.

Aspect 25: The method of Aspect 24, wherein the fourth encrypted data is generated based on a product of the second encrypted data and the difference between the first encrypted data and the fifth encrypted data.

Aspect 26: The method of Aspect 22, wherein the key derivation function includes a password-based key derivation function.

Aspect 27: The method of Aspect 22, wherein the verification data (pA) of the first device includes one of a personal identification number (PIN), a password, a phrase, or an address.

Aspect 28: An electronic device for determining a match between verification data (pB) of the electronic device and verification data (pA) of a remote device, the electronic device comprising: a memory; and one or more processors coupled to the memory, the one or more processors being configured to: receive a public key from a pair of keys including a public fully homomorphic encryption (FHE) key and a private FHE key, receive first encrypted data (cA) generated based on encryption of at least the verification data (pA) of the remote device using the public FHE key, generate second encrypted data (cB) at least in part by encrypting verification data (pB) of the electronic device using the public FHE key; generate third encrypted data (cR) at least in part by encrypting a random factor (r) using the public FHE key; generate fourth encrypted data (cH) at least in part by encrypting a key derivation function of the verification data (pA) of the remote device using the public FHE key; generate verification ciphertext (c) at least in part by encrypting a combination of the first, the second, the third, and the fourth encrypted data using the FHE public key; and receive a match result from the remote device if decryption of the verification ciphertext (c), using the FHE private key matches the key derivation function of the verification data (pA) of the remote device.

Aspect 29: The electronic device of Aspect 28, wherein the one or more processors are configured to generate the fourth encrypted data based on a difference between the first encrypted data and the fifth encrypted data.

Aspect 30: The electronic device of Aspect 28, wherein the one or more processors are configured to encrypt the verification data (pB) of the first device using a private key associated with the second device.

Aspect 31: A method for determining a match between verification data (pB) of a first device and verification data (pA) of a second device, the method comprising: receiving, at the first device, a public key from a pair of keys including a public fully homomorphic encryption (FHE) key and a private FHE key, receiving, at the first device, first encrypted data (cA) generated based on encryption of at least the verification data (pA) of the second device using the public FHE key, generating, at the first device, second encrypted data (cB) at least in part by encrypting verification data (pB) of the first device using the public FHE key; generating, at the first device, third encrypted data (cR) at least in part by encrypting a random factor (r) using the public FHE key; generating, at the first device, fourth encrypted data (cH) at least in part by encrypting a key derivation function of the verification data (pA) of the second device using the public FHE key; generating, at the first device, verification ciphertext (c) at least in part by encrypting a combination of the first, the second, the third, and the fourth encrypted data using the FHE public key; and receiving, at the first device, a match result from the second device if decryption of the verification ciphertext (c), using the FHE private key matches the key derivation function of the verification data (pA) of the second device.

Aspect 32: The method of Aspect 31, wherein the fourth encrypted data is generated based on a difference between the first encrypted data and the fifth encrypted data.

Aspect 33: The method of Aspect 31, wherein the verification data (pB) of the first device is encrypted using a private key associated with the second device.

Aspect 34: A computer-readable storage medium storing instructions that when executed cause one or more processors of a device to perform the methods of any of aspects 1 to 33.

Aspect 35: An apparatus comprising one or more means for performing operations according to any of aspects 1 to 33.

What is claimed is:

1. A method for determining a match between verification data (pA) of a first device and verification data (pB) of a second device, comprising:
generating, at the first device, a pair of keys including a public fully homomorphic encryption (FHE) key and a private FHE key;
sending, by the first device, the public FHE key to the second device;
generating, at the first device, first encrypted data (cA) at least in part by encrypting the verification data (pA) of the first device using the public FHE key of the first device;
sending, by the first device, the first encrypted data to the second device;
generating, at the second device, second encrypted data (cB) at least in part by encrypting the verification data (pB) of the second device using the public FHE key of the first device;
generating, at the second device, third encrypted data (cR) at least in part by encrypting a random factor (r) using the public FHE key of the first device;
generating, at the second device, fourth encrypted data (cH) at least in part by encrypting a key derivation function of the verification data (pB) of the second device using the public FHE key of the first device;
generating, at the second device, verification ciphertext (c) at least in part by encrypting a combination of the first, the second, the third, and the fourth encrypted data using the public FHE key of the first device;
receiving, at the first device from the second device, the verification ciphertext;
decrypting, at the first device, the verification ciphertext using the private FHE key of the first device to obtain a verification plaintext (p); and
verifying, at the first device, that the verification plaintext (p) matches the key derivation function of the verification data (pA) of the first device.

2. The method of claim 1, further comprising sending a result of the match to the second device.

3. The method of claim 1, wherein the fourth encrypted data is generated based on a difference between the first encrypted data and fifth encrypted data.

4. The method of claim 3, wherein the fourth encrypted data is generated based on a product of the second encrypted data and the difference between the first encrypted data and the fifth encrypted data.

5. The method of claim 1, wherein the key derivation function includes a password-based key derivation function.

6. The method of claim 1, wherein the verification data (pA) of the first device includes one of a personal identification number (PIN), a password, a phrase, or an address.

7. An electronic device for determining a match between verification data (pB) of the electronic device and verification data (pA) of a remote device, the electronic device comprising:
a memory; and
one or more processors coupled to the memory, the one or more processors being configured to:
receive a public key from a pair of keys including a public fully homomorphic encryption (FHE) key and a private FHE key;
receive first encrypted data (cA) generated based on encryption of at least the verification data (pA) of the remote device using the public FHE key;
generate second encrypted data (cB) at least in part by encrypting verification data (pB) of the electronic device using the public FHE key;
generate third encrypted data (cR) at least in part by encrypting a random factor (r) using the public FHE key;
generate fourth encrypted data (cH) at least in part by encrypting a key derivation function of the verification data (pA) of the remote device using the public FHE key;
generate verification ciphertext (c) at least in part by encrypting a combination of the first, the second, the third, and the fourth encrypted data using the FHE public key; and
receive a match result from the remote device if decryption of the verification ciphertext (c), using the FHE private key matches the key derivation function of the verification data (pA) of the remote device.

8. The electronic device of claim 7, wherein the one or more processors are configured to generate the fourth encrypted data based on a difference between the first encrypted data and fifth encrypted data.

9. The electronic device of claim 7, wherein the one or more processors are configured to encrypt the verification data (pB) of the first device using a private key associated with the second device.

10. A method for determining a match between verification data (pB) of a first device and verification data (pA) of a second device, the method comprising:
receiving, at the first device, a public key from a pair of keys including a public fully homomorphic encryption (FHE) key and a private FHE key;
receiving, at the first device, first encrypted data (cA) generated based on encryption of at least the verification data (pA) of the second device using the public FHE key;
generating, at the first device, second encrypted data (cB) at least in part by encrypting verification data (pB) of the first device using the public FHE key;
generating, at the first device, third encrypted data (cR) at least in part by encrypting a random factor (r) using the public FHE key;
generating, at the first device, fourth encrypted data (cH) at least in part by encrypting a key derivation function of the verification data (pA) of the second device using the public FHE key;
generating, at the first device, verification ciphertext (c) at least in part by encrypting a combination of the first, the second, the third, and the fourth encrypted data using the FHE public key; and
receiving, at the first device, a match result from the second device if decryption of the verification ciphertext (c), using the FHE private key matches the key derivation function of the verification data (pA) of the second device.

11. The method of claim 10, wherein the fourth encrypted data is generated based on a difference between the first encrypted data and fifth encrypted data.

12. The method of claim 10, wherein the verification data (pB) of the first device is encrypted using a private key associated with the second device.

* * * * *